United States Patent
Knee et al.

(10) Patent No.: US 6,285,716 B1
(45) Date of Patent: Sep. 4, 2001

(54) VIDEO COMPRESSION

(75) Inventors: Michael James Knee, Petersfield; Bruce Fairbairn Devlin, Chiddingford; Nicholas Dominic Wells, Brighton, all of (GB)

(73) Assignees: Snell & Wilcox Limited, Hampshire; British Broadcasting Corporation, London, both of (GB)

( * ) Notice: Subject to any disclaimer, the term of this patent is extended or adjusted under 35 U.S.C. 154(b) by 0 days.

(21) Appl. No.: 08/767,448

(22) Filed: Dec. 16, 1996

Related U.S. Application Data (63) Continuation of application No. PCT/GB95/01433, filed on Jan. 30, 1995.

(30) Foreign Application Priority Data

| Jun. 17, 1994 | (GB) | 9412148 |
| Jan. 30, 1995 | (GB) | 9501741 |

(51) Int. Cl.$^7$ .................................................. H04N 7/36
(52) U.S. Cl. .................................. 375/240.28; 348/423.1
(58) Field of Search ........................ 375/240, 240.28; 348/17, 423, 845, 423.1

(56) References Cited

U.S. PATENT DOCUMENTS

| 5,600,646 | * | 2/1997 | Polomski | 348/17 |
| 5,805,224 | * | 9/1998 | Keesman | 348/405 |

FOREIGN PATENT DOCUMENTS

| 0 584 741 A2 | 3/1994 | (EP) . |
| 0 618 734 A2 | 10/1994 | (EP) . |
| 0 627 858 A2 | 12/1994 | (EP) . |
| 0 637 893 A1 | 2/1995 | (EP) . |
| 0 492 528 | 10/1996 | (EP) ............................. G11B/20/10 |

OTHER PUBLICATIONS

C. Herpel, Der MPEG–2–Standard: Generische Codierung Für Bewegtbilder und Zugehörige Audio–Information, Hierarchische Video–Codierung: Ansätze zur Service–Interoperabilität (Teil 3), Fernseh–Und Kino–Technik, vol. 48, Jahrgang, No. 6, 1994, pp. 311–316, 318–319 (No translation provided).

Alexander G. (Sandy) MacInnis, "MPEG–2 Systems," *Digital Video Compression on Personal Computers: Algorithms and Technologies*, Spie Proceedings Series, vol. 2187, pp. 274–278.

* cited by examiner

*Primary Examiner*—Howard Britton
(74) *Attorney, Agent, or Firm*—Townsend and Townsend and Crew LLP; Kenneth R. Allen (57) ABSTRACT

An MPEG-2 or other compressed video stream (CP) can be manipulated as separate information bus (IB) and coefficient (CP*) streams. The information bus stream (IB) contains motion vector information but also information derived from a previous decoding operation (14, 18) for use in a subsequent coding operation (22). Processing in the coefficient domain enables bit rate conversion without decoding to the pixel level and also simplifies the combination of MPEG layers.

12 Claims, 7 Drawing Sheets

Fig.5.
INFO BUS ORIGINATOR

Fig.6.
INFO BUS INSERTER

VIDEO COMPRESSION

This application is a continuation of and claims the benefit of U.S. International Application No. PCT/GB/01433 having an International Filing Date of Jun. 19, 1995, the disclosure of which is incorporated by reference.

This invention relates to video compression.

In an important example, the present invention concerns itself with MPEG-2 which is an emerging standard for the digital compression of video signals. As is well known, MPEG-2 is a development of MPEG-1 which was directed towards low bit rate storage applications such as CD-ROM and had no interlace capability. Without specifying the manner in which a video signal is coded, MPEG-2 defines a bitstream syntax and a set of rules for a decoder to regenerate the picture.

One object of the present invention, in certain of its forms, is to provide improved MPEG-2, or other compression, encoders and decoders.

In certain of its aspects, this invention is concerned more particularly with the performance of a signal transmission chain rather than the performance of a single compression coder or decoder, or indeed of a transmission coder and decoder pair (codec).

In a signal transmission chain, several codecs might be connected in cascade with switching, re-multiplexing or other processing operations performed between each codec. In addition, the start (or indeed, any intermediate point of the chain) may involve some pre-processing such as noise reduction, and the end of the chain (or again, an intermediate point) may involve some post-processing such as display conversion.

In a conventional signal chain, each codec pair operates in isolation from other codecs and from the intervening signal processes. This can lead to inefficiency and loss of performance; inefficiency because each encoder is obliged to recalculate all its coding parameters such as motion vectors, and loss of performance because impairments introduced at an earlier point in the chain might unknowingly be re-coded as picture information.

It is an object of one form of the present invention to provide an improved signal transmission chain which removes or reduces this inefficiency and loss of performance.

Accordingly, the present invention consists, in one aspect, in a signal transmission chain comprising at least one compression coder adapted to receive a signal and to generate therefrom a compressed or partially compressed coded signal and at least one compression decoder adapted to receive a compressed or partially compressed coded signal and to generate therefrom a decoded or partially decoded signal, characterised in that an information bus extends from a decoder or to a coder in the chain, the information bus carrying information relating to an earlier coding operation for use in a later signal process.

Suitably, the information bus extends from a decoder to a later coder in the chain.

In the preferred example, the decoded signal is a picture signal.

In one form of the invention, the information bus is used in a post-processing operation such as display upconversion. Similarly, in some arrangements according to the invention, an information bus is generated in a pre-processing operation such as motion compensated noise reduction. Within a signal processing chain, the information bus may additionally be of assistance within signal processes other than encoding/decoding, an example here being motion compensated standards conversion.

This invention is not restricted to any particular compression technology but MPEG-2 will be taken as an example. It is known within MPEG-2 that a compressed or coded picture signal within a codec pair is usefully accompanied by side chain information. This side chain information may be similar to information which the present invention supplies on the information bus. Indeed, it will be convenient to generate the information bus from the side chain. It should be stressed, however, that the invention is providing something very different from what has previously been proposed under MPEG-2. The existence of a side chain within a codec pair cannot cure the inefficiency and loss of performance which has been described as arising between one codec pair and another in a complete signal transmission chain. It is the proposal according to the present invention in which the output of a decoder (usually a full bandwidth picture signal, but sometimes a partially decoded signal) which is accompanied by an information bus, so that subsequent encoding or other processing in later portions of the transmission chain can make use of the information about earlier encoding.

The present invention, in a further aspect, recognizes that certain video processes hitherto conducted by first decoding a compressed signal to a picture, can very usefully be conducted without leaving the compressed domain. One example is bit rate conversion where, for example, a compressed signal at 6 Mbits/s must be converted for transmission along a channel capable of supporting only 4 Mbit/s. Decoding the 6 Mbit/s signal and re-encoding at 4 Mbit/s, runs the risk of introducing fresh errors and is inefficient. It is an object of this invention to provide an improved method of processing which overcomes this problem.

Accordingly, the present invention consists, in a further aspect, in a method of processing a compressed signal, comprising the steps of variable length decoding the signal; inverse quantising such decoded signal to produce a coefficient stream; re-quantising the coefficient stream optionally at a new bit rate and variable length coding the re-quantised, coefficient stream.

This aspect of the invention will find applications outside bit rate conversion. It will for example be necessary in some applications to combine compressed signals. This will arise in relation to the so-called SNR profile of MPEG-2, which will now be described.

There are defined within MPEG-2, different profiles and levels which are—broadly speaking—directed toward different video applications. Thus, for example, "Main Profile" at "Main Level" MPEG-2 provides only for standard definition television whereas the "Spatially Scalable Profile" at the same level can also accommodate high definition display.

Certain profiles within MPEG-2 employ the concept of "layering". This intended to enable decoders of different sophistication to operate upon the same coded signal. A basic decoder might make use of only the lowest layer of information in the coded signal; a more advanced decoder would make use of a higher layer or layers.

There is believed to be a need within MPEG-2 to provide for a coded signal which is resilient in the face of less than optimal transmission channels. By this is meant a coded signal which contains sufficient information for the regeneration of a high quality picture, but in a form which can still sensibly be decoded if a portion of the information is lost, albeit to produce a picture of reduced quality. In this context, the concept of layers is again employed with a basic layer of information being routed at all times through the highest priority and most reliable path in the transmission channel.

One or more enhancement layers, which are not essential for the regeneration of a picture but which improve performance, are sent along lower priority paths. One profile operating in this manner under MPEG-2 is the so-called SNR Profile.

An SNR-Profile MPEG-2 coder will output two coded streams; a lower layer containing the most significant digits of the DCT coefficients and an enhancement layer containing the least significant digits, in both cases quantised and variable length coded. The SNR Profile signal is of course not compatible with a Main Profile decoder, unless the enhancement layer is discarded.

Already, Main Profile decoders are available relatively cheaply in standard VLSI form; this will not be the case for SNR Profile decoders for some time. Accordingly, there would in a number of applications be economic advantage in converting an SNR Profile signal in two streams, to a single stream Main Profile signal. The trivial example of decoding from one profile to a picture and recoding that picture at the new profile, is obviously unhelpful.

It is one object of this further aspect of the invention to provide for the conversion of an SNR Profile MPEG-2 signal in two streams into a Main Profile signal with the minimum of processing and with minimal loss of information.

It is a further object of this aspect of the invention to provide for elegant and straightforward processing of an MPEG-2 or other compressed signal.

Accordingly, the present invention consists, in a further aspect, in a method of combining a plurality of compressed signals, comprising the steps of variable length decoding each compressed signal; inverse quantising each such decoded signal to produce a coefficient stream; combining the coefficient streams to form a combined coefficient stream; re-quantising the combined coefficient stream and variable length coding the re-quantised, combined coefficient stream.

Preferably, the compressed signals comprise at least two layers of An SNR profile MPEG-2 signal.

The present invention recognises that there exists a novel, intermediate domain in which different layers (such as the lower and enhancement layers in the SNR profile) are readily combinable. Once synchronicity has been ensured, for example, it will usually be possible for the two streams to be simply added. This intermediate domain will be referred to as the coefficient domain.

The present invention will have application well beyond bit rate conversion and the conversion of dual SNR profile streams to main profile format. It will be possible to perform other useful processing within the coefficient domain. Thus, the invention will find application in re-multiplexing. It will permit—for example—the de-multiplexing of a group of channels, the addition of a further channel in synchronism, and re-multiplexing—all without returning to the level of pixels. Establishing sychronocity between two slightly out of sync bit streams, will sometimes be an end in itself, again readily accomplished in the coefficient domain, following the present invention.

The formation of an information bus for MPEG-2 has already been proposed. Information from the variable length decoding according to the present invention can conveniently feed an information bus generator. This same information can in accordance with the present invention, be supplied to a microcontroller or microprocessor controlling the re-quantisation step to maximise re-coding efficiency and optimise buffer occupancy. Indeed, the ability to extract coding information from an incoming MPEG stream, without decoding to pixels, is itself an important advantage offered by the present invention.

The present invention will now be described by way of example with reference to the accompanying drawing in which.

Figure 1:
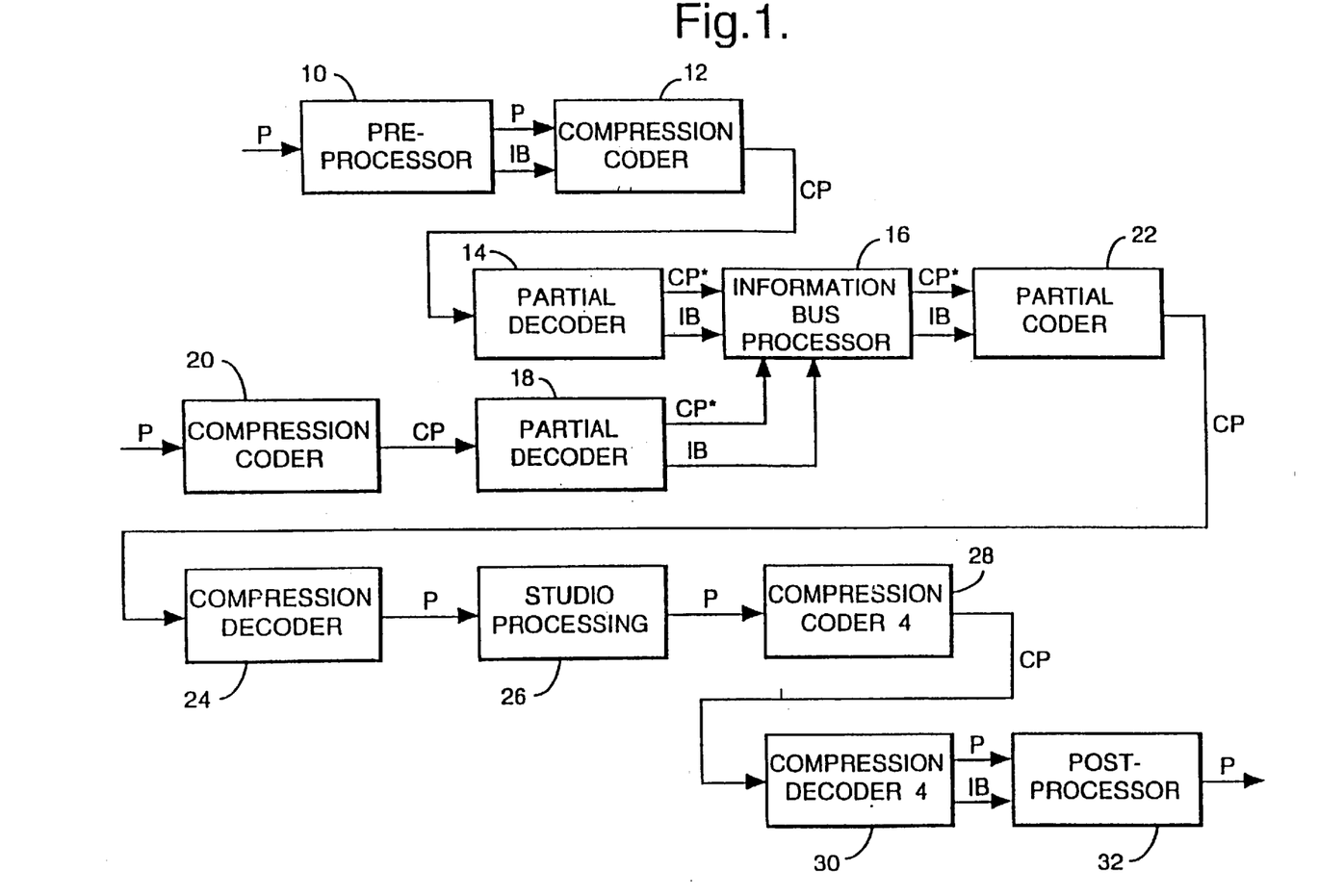
FIG. 1 is a block diagram of an illustrative picture signal transmission chain according to the present invention.

FIG. 1 shows an illustrative signal transmission chain comprising four compression coders and three decoders, some of which incorporate the information bus, together with some intervening processing. A picture signal P forms the input to a pre-processor 10 which performs a function such as motion-compensated noise reduction. The output of the pre-processor is a picture signal P and an information bus signal IB which together form the input to a first compression coder 12. The information bus contains information which might assist the coding process, such as recommended motion vectors or the identification of material having film or video origins and, for film, detection of the phase of the 3:2 pultdown telecine sequence. Within coder 12, the information bus can be used as an internal path for coding decisions, so it may be modified by the coder's own decision processes such as coding mode selection and rate control. Ultimately, the information bus contains all the side information that is sent alongside the DCT coefficients in a conventional MPEG-2 bitstream.

The path between coder 12 and decoder 14 is a coded picture signal CP in the form of an unmodified bitstream consisting of the DCT coefficients and the side information. Decoder 14 is a partial decoder, which means that its main output CP is not a fully decoded picture signal but a signal decoded to some intermediate stage, here for example DCT coefficients. The use of such an intermediate domain is mentioned above and will be described in more detail below. The second output from the partial decoder 14 is an information bus signal IB, which consists of the side information decoded from the transmitted bitstream. As in coder 12, the information bus can additionally be used within the decoder as an internal path by which side information is communicated throughout the partial decoding process.

In this example, the information bus IB and partially decoded picture CP* outputs of decoder 14 are fed to an information bus processor 16, which also receives equivalent inputs from a second partial decoder 18 linked to a second coder 20. The function of the information bus processor is to combine the two partially decoded picture signals CP* in some way, making advantageous use in this of the two information bus bitstreams IB, and to produce a new information bus output IB alongside the combined partially decoded picture signal output CP*. For example, the information bus processor might include an intelligent switcher that takes information about the instantaneous bit-rates and group-of-pictures (GOP) structures used in the two previous codecs and uses it to minimize artifacts and to maximize coding efficiency in the subsequent partial coding process in coder 22. In this example, coder 22 can be essentially a "dumb" partial coder in that it simply obeys the coding decisions conveyed to it by the information bus.

The coded output CP of coder 22 is decoded by decoder 24, which for the sake of this example is a conventional MPEG-2 decoder with a fully decoded picture output P and no information bus output. This illustrates that it is not necessary to use information bus processing throughout a transmission chain in order for it to have benefit. In fact, the information bus can exist in islands between decoders and subsequent encoders.

The output of decoder 24 is passed through some studio processing in block 26, for example a standards conversion, which in this example is not provided with an information bus processing. In another arrangement, however, the standards conversion would make use of information bus processing.

Coder 28 is a conventional coder which makes no use of an information bus input (though information bus processing may have been used advantageously within the coder as a means of controlling the individual coding steps and of formatting the side information prior to insertion in the video multiplex). Its output CP is decoded by decoder 30 which uses information bus processing but differs from decoders 14 and 18 in that its main output is a fully decoded picture signal P. This picture signal and its associated information bus IB are fed to a post-processor 32 which performs a display-related function such as field rate up-conversion. Here, the information bus bitstream is used advantageously to assist the postprocessor, for example by providing motion vectors. It is recognized that the motion vectors may themselves need some post-processing to adapt them to the display upconversion application. However, this requirement can be minimized by the use of "true" motion vectors in the motion estimator of coder 28. By this is meant that the "motion" vectors in compression techniques have usually hitherto been selected with the sole aim of providing efficient compression; vectors selected according to this criterion are not necessarily the most accurate measures of motion available. If it is elected to use "true" motion vectors for the compression procedures, the advantage is obtained that the motion vectors can, as explained, be used with minimum further treatment in the display upconversion or other motion compensated process.

A particular example of the physical format of the information bus will now be described. In essence, the information bus signal is a digital signal that accompanies a picture signal or a partially encoded or decoded picture signal. It contains two parts which may be time multiplexed together, though other means of combining the two parts are not excluded. The first part (which may be regarded as the core information) consists of all the side information that controls the compression coding or decoding, typically in a form from which individual pieces of information can easily be extracted. In practice, this means that the core information is carried in a fixed-length coding format, in contrast to coded bitstream format which may involve variable-length coding. The core information consists of, predominantly, motion vectors with additional information such as the number of the coding mode currently in use and the quantisation step size. The second part consists of additional information which is related to the control of the coding or decoding process but which does not form part of the coded bitstream. It includes, for example, statistical information such as the number of bits being used for coding luminance and chrominance blocks and for coding motion vectors. It will usually also include information concerning errors together with instructions for use in error concealment. Candidate motion vectors or recommended quantizer step sizes may also be included.

In the case of MPEG-2, the information bus carries information which varies at different rates: sequence, GOP, picture, slice and macroblock. It is also intended to be kept in synchronism with the picture signal, which for most of its life within the codec may be in a macroblock scanning format with a picture blanking interval. For this reason, one particular form of the information bus is arranged in a two level structure, with sequence, GOP and picture rate information carried in the picture blanking interval and slice and macro-block rate information carried in a macroblock based structure that is co-timed with the picture signal.

The information rate required for the information bus necessitates a parallel signal format, if the clock rate used for the picture signal is to be retained. In one particular embodiment, a four bit wide signal is used internally. For external use, this signal is converted to a format compatible with the luminance component of a CCIR Rec.656 signal, so that it pass between existing devices. In both cases, macroblock and picture addressing information is included in the format so that synchronism with the picture signal can easily be verified.

The information bus will in this example include at least two timing signals: a picture rate signal and a macroblock signal. These signals are used, as will be described, in information interpreters and inserters which decode, update or insert selected pieces of information within the information bus.

Dealing first with picture rate information, this—as mentioned—will include "repeats" of information changing at the GOP or sequence level. To facilitate use by devices which require only "true" picture rate information, the picture rate information may usefully be provided in two bursts, the first of which contains all the GOP and sequence information and can be ignored by devices if they choose. The first burst of the picture rate information might therefore include:

Burst I
   Global Picture Rate Information
   New sequence and GOP header flags
   MPEG1/MPEG2 flag
   Decoded or "raw" motion vectors flag
   Sequence Rate Information
   Horizontal and vertical sizes
   Aspect ratio
   Frame rate
   Colour information
   GOP Rate Information
   Time code The second burst will include picture rate information such as:

Burst II
   Core Information
   Time reference
   Coding type
   Horizontal and vertical display offsets Quantiser matrix information
Non-Core Information
Motion vector source
Cut detection
Numbers of I, P and B frames remaining in GOP
Film phase (or 3:2 pulldown) detection
Field or frame like index
Pan vector identification
Letterbox detection Turning now to macro rate information, this can be broken down into address information, core information (which may include slice rate information) and derived or non-core information. Examples are:

Address Information
   Picture address
   Stripe number
   Position within stripe
Core Information
   Macroblock type
   Motion type (field/frame)
   Motion vector types
   Motion vectors
Derived Information
   Macroblock scan mode
   Error concealment flag
   Causes for concealment
   Numbers of bits used for:
     Motion vectors
     Other overheads
     Luminance
     Chrominance
   Candidate motion vectors Examples of apparatus implementing the information bus, in addition to the information bus processor referred to above, will now be described, again with particular reference to MPEG-2.

Figure 2:
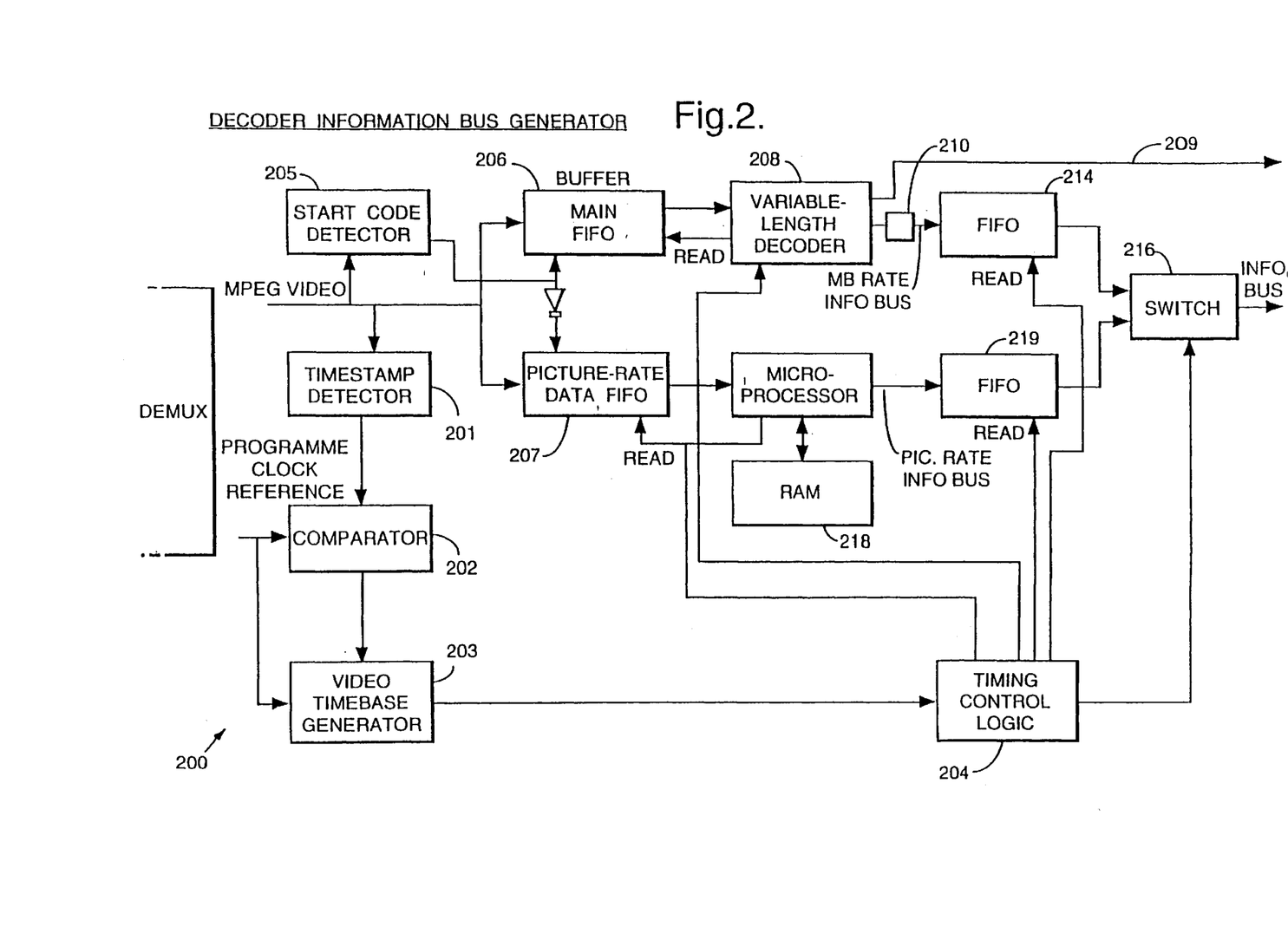
FIG. 2 is a block diagram of an information bus generator according to the invention.

Referring to FIG. 2, there is shown a decoder information bus generator 200. Briefly, with respect to a timebase synchronous with the decoded picture signal, derived from transmitted clock reference and timestamp information, a picture and macroblock rate stream of nibbles (4-bit words) is generated containing the side information decoded from the bitstream, together with macroblock addressing information, according to a predetermined fixed structure map. In more detail, a time stamp detector 201 detects time stamps from an incoming MPEG compressed signal. These timestamps are compared in comparator 202 with program clock references such that, as a predetermined "MPEG time" is attained, a time base is generated in video timebase generator 203 and passed to timing control logic block 204. This arrangement effectively provides a timing interface between the variable length coding world and the video world.

Figure 3:
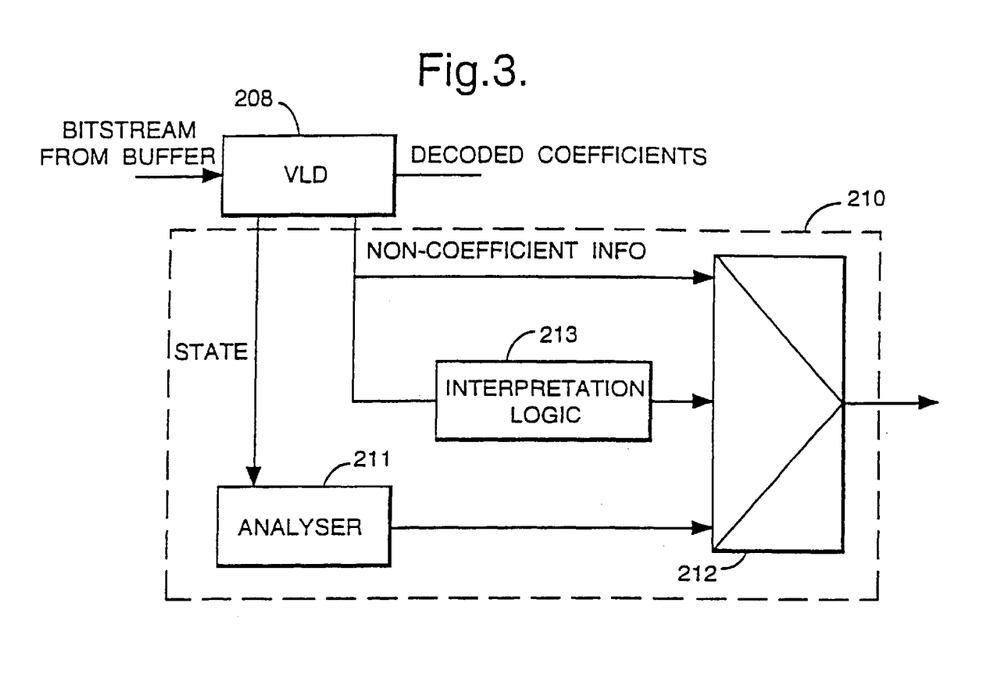
FIG. 3 is a block diagram illustrating in more detail, certain components of the circuit shown in FIG. 2.

A start code detector 205 operating on the MPEG signal controls the writing of information into either a main FIFO 206 holding macroblock rate information and serving as the conventional MPEG buffer, or a picture rate information FIFO 207. Under control of the timing control logic 204, a variable length decoder 208 operates on the output of buffer 206 to derive DCT coefficients which are made available to the remainder of the decoder at line 209. The non-coefficient data is passed to an information bus formatter 210. For clarity, the information bus formatter, together with the variable length decoder 208, is shown in more detail in FIG. 3 to which reference is now directed. The variable length decoder 208 can be regarded as a state machine and the current state is made available to an analyzer 211. This analyzer serves to derive the various types of "statistical" macroblock rate information described above, which then passes to a multiplexer 212. This multiplexer receives certain non-coefficient information (such as motion vectors) directly from the variable length decoder 208. Others pieces of information, mainly flags, pass through interpretation logic 213.

Returning to FIG. 2, the output of information bus formatter 210 is buffered in a FIFO 214 before passing to an information bus output switcher 216. In a generally similar fashion, picture rate information from FIFO 207 is decoded and formatted in microprocessor 217 using RAM 218. The function of the information bus formatter 210 is effectively performed at picture rate through software in the microprocessor 217. The picture rate information bus information is buffered in FIFO before passing as the second input to switcher 216.

Figure 4:
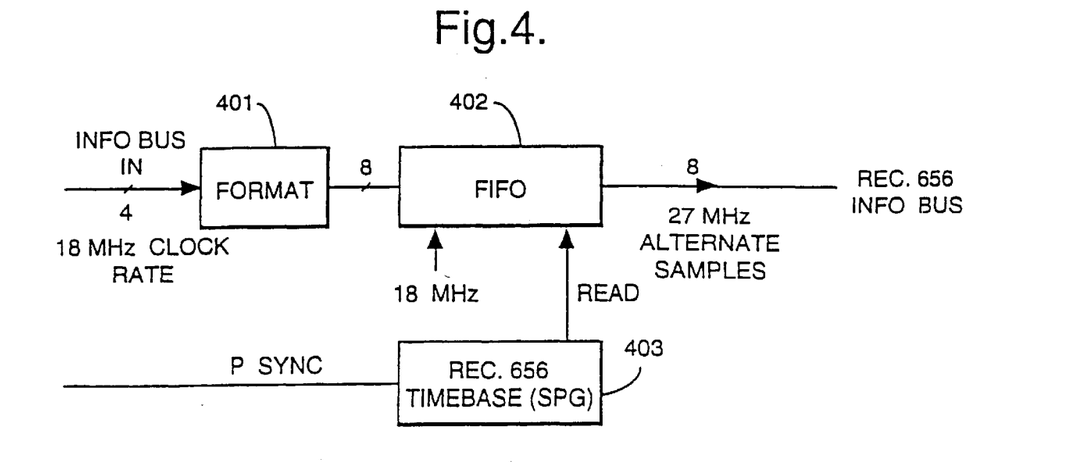
FIG. 4 is a block diagram of an information bus interface according to the invention.

Turning now to FIG. 4, there is shown a decoder information bus interface which converts from the format described above to a CCIR Rec. 656 compatible format. This enables straightforward communication between separate pieces of equipment and may also allow recording on D1 VTR's. An information bus signal according to this invention is presented to a formatting block 401. The information bus signal will typically be 4 bits wide and clocked at 18 MHz. The formatter provides an 8 bit wide signal which is read at 18 MHz into FIFO 402. The picture timing signal is provided as a control signal to a Rec. 656 timebase block 403 which, in turn, provides a read clock to FIFO 402. In this way, a Rec. 656 information bus is output.

A coder information bus interface converts from the CCIR Rec. 656 compatible format to the nibble-wide internal format in analogous fashion.

Figure 5:
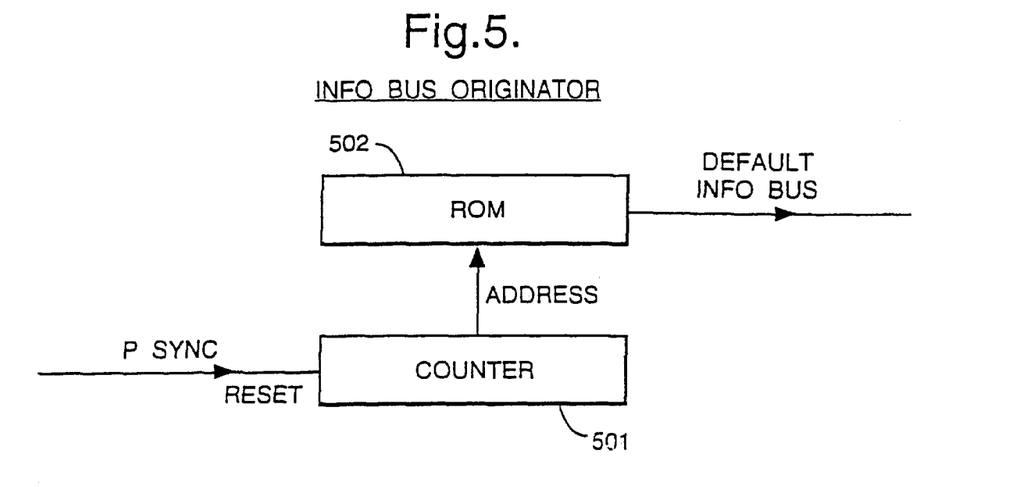
FIG. 5 is a block diagram of an information bus originator according to the invention.

An information bus originator is illustrated in FIG. 5. This uses a coder's picture signal timebase to create a "blank" nibble-wide information bus signal with macroblock addressing information but with uncommitted information slots. Thus, the picture timing signal is taken as an input to a counter 501 which provides address information to a ROM 502 which has stored within it a "blank" information bus for an entire picture.

Figure 6:
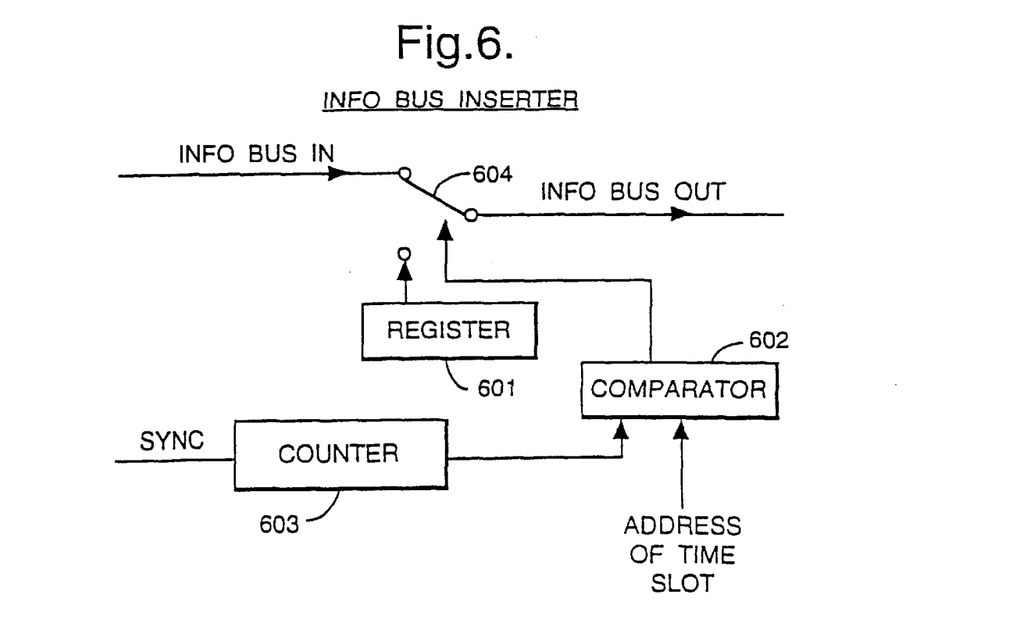
FIG. 6 is a block diagram of an information bus inserter according to the invention.

Referring now to FIG. 6, there is shown an information inserter which serves to take a particular piece of information and insert it to the appropriate slot in the information bus format. This can operate to "fill" a blank information bus as described above or to update one particular piece of information in an existing and fully functioning information bus. The approach taken is that the piece of information to be inserted is written to a register 601 and the location of that piece of information in terms of clocks is provided as one input to a comparator 602. A counter 603 receives picture and macroblock timing signals as appropriate and provides the second input to comparator. 602. At the correct time-slot, the output of comparator 602 controls switch 604 to insert the contents of register 601 into the information bus.

Figure 7:
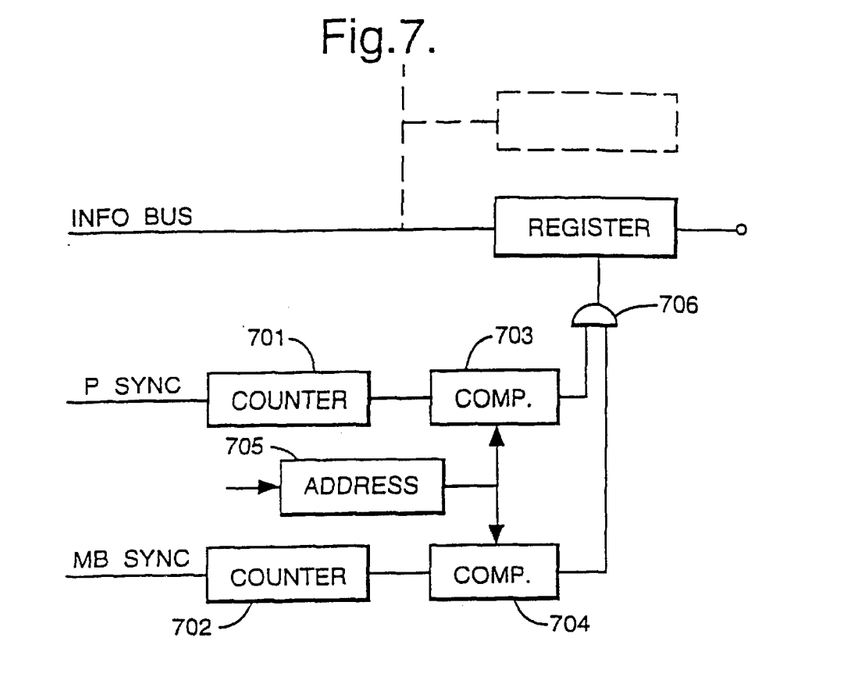
FIG. 7 is a block diagram of an information bus interpreter according to the invention.

An information interpreter is required to decode a particular piece of information from the information bus and an example is shown in FIG. 7. Picture and macroblock timing signals $P_{sync}$ and $MB_{sync}$ are taken to respective counters 701 and 702. The outputs of these counters are compared in respective comparators 703 and 704 with the address of the required piece of information held in address store 705. The information bus signal passes continuously through parallel registers, only one of which is shown in the drawing at 707.

The contents of the appropriate register are then read out as the counted $P_{sync}$ and $MB_{sync}$ signals coincided with the preset address.

Figure 8:
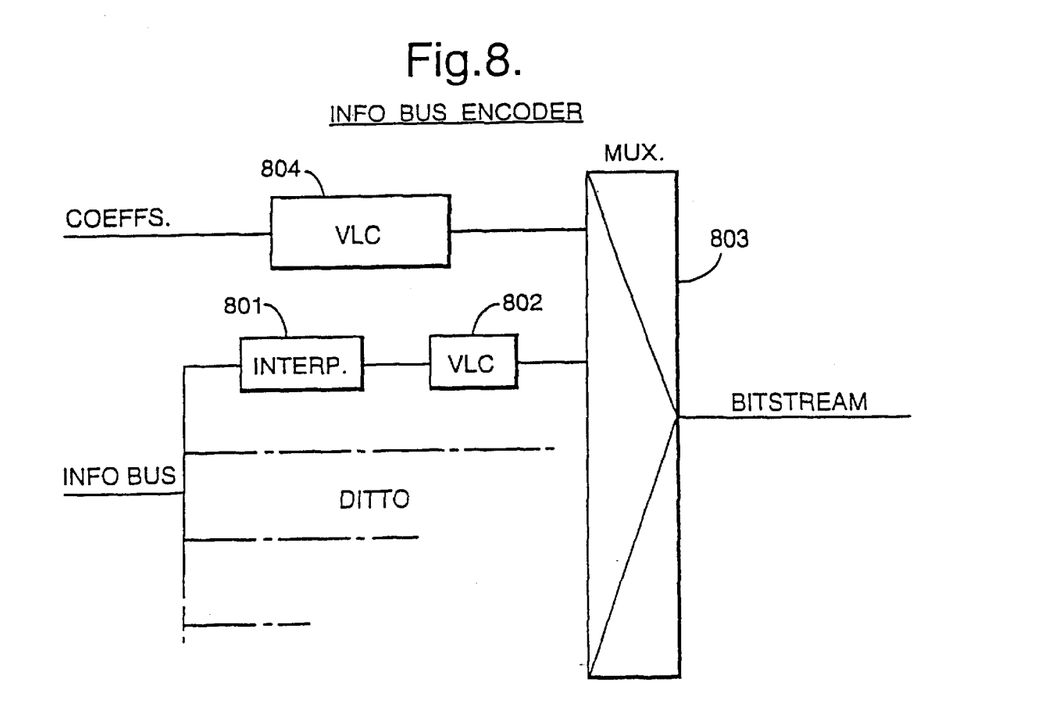
FIG. 8 is a block diagram of an information bus encoder according to the invention.

FIG. 8 illustrates an example of an information bus encoder. This serves at the end of a coder's processing to convert the information bus into a form suitable for transmission alongside the coefficient information. Thus, the information bus is presented to parallel paths each of which contains an information bus interpreter 801 as previously described. This feeds a variable length coder 802. The outputs of the variable length coders 802, together with the output of a variable length coder 804 operating on the coefficient information, serve as inputs to a multiplexer 803 which generates the required MPEG-2 bitstream.

Figure 9:
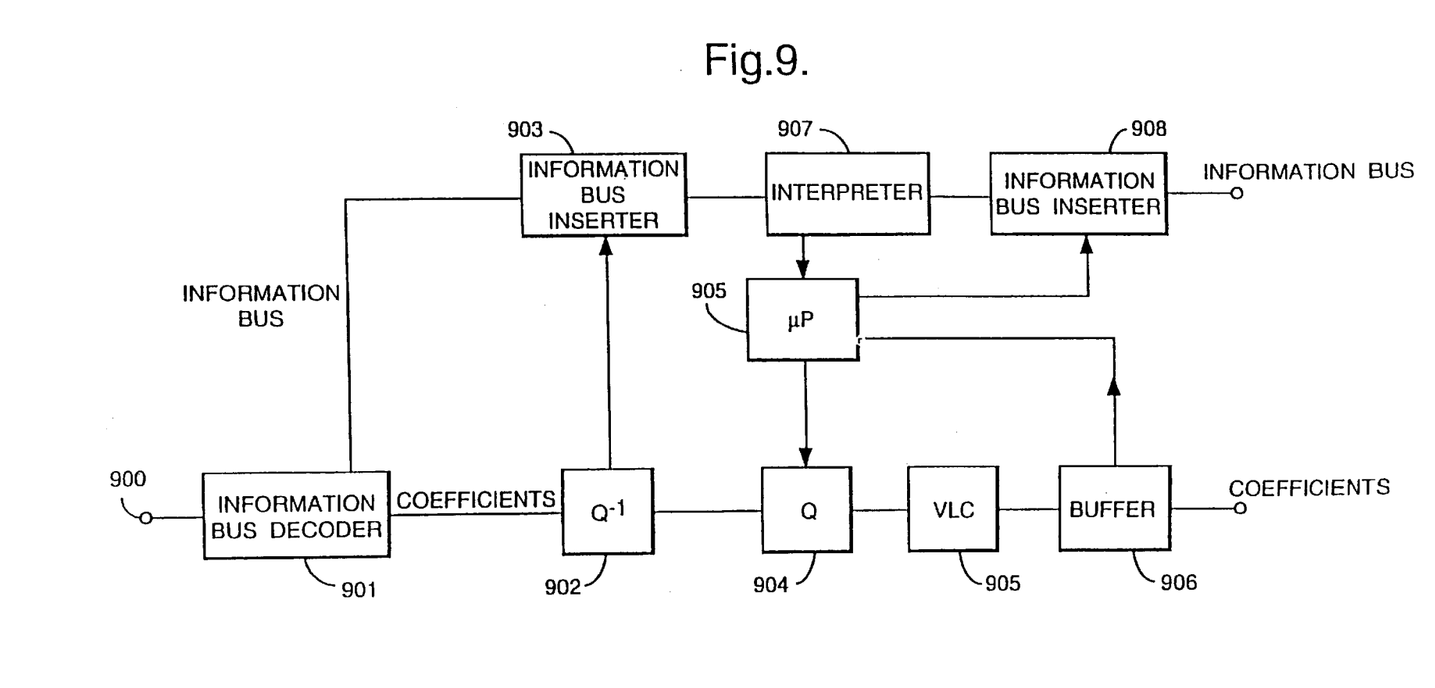
FIG. 9 is a block diagram of a bit rate converter according to the invention.

In another embodiment, the present invention provides a bit rate converter. This may be required, for example, to convert an MPEG-2 signal at 6 MBit/s to a signal compressed at 4 MBit/s. An example of a bit rate converter according to the present invention is shown in FIG. 9. Thus, an MPEG-2 signal received at a terminal 900, passes through an information bus decoder 901, which as described above includes a variable length decoder, providing an information bus output and a coefficient stream. The latter is taken to an inverse quantisation unit 902 which passes information concerning quantisation levels to a first information bus inserter 903 which inserts this information into the information bus. A quantisation unit 904 operates under control of a microprocessor 905 to re-quantise the signal at quantisation levels appropriate to the desired output bit rate. The output of quantisation unit passes through a variable length encoder 905 to a buffer 906 from which information can be read at the desired bit rate. Buffer occupancy is monitored by the microprocessor 905 which controls quantisation levels in the quantisation unit 904 to avoid overflow. Use may be made by the microprocessor of information taken from the information bus in interpreter 907. Similar, new quantisation levels selected by the microprocessor are added to the information bus by a second information bus interpreter 908. The updated information bus and coefficient stream can be combined in an information bus decoder as previously described to provide an MPEG-2 output.

In still another embodiment, the present invention provides an SNR layer combiner. This as mentioned above serves to convert an SNR Profile signal in two streams, to a single stream Main Profile signal. Thus referring to FIG. 10, the lower SNR layer received at a terminal 110, passes through a lower layer buffer 112 and is variable length decoded in a VLD 114 utilising the look up table 116. Similarly, the enhancement SNR layer, received at a terminal 118 through an enhancement layer buffer 120, is decoded in a VLD 122 using the look up table 124. It will be understood that the table contents need not be constant but can be switched from set to set dynamically, in dependence upon picture character. Overflow in the decoding paths, through variation in the rate in which coded information is received, is avoided through the buffers 112 and 120.

Figure 10:
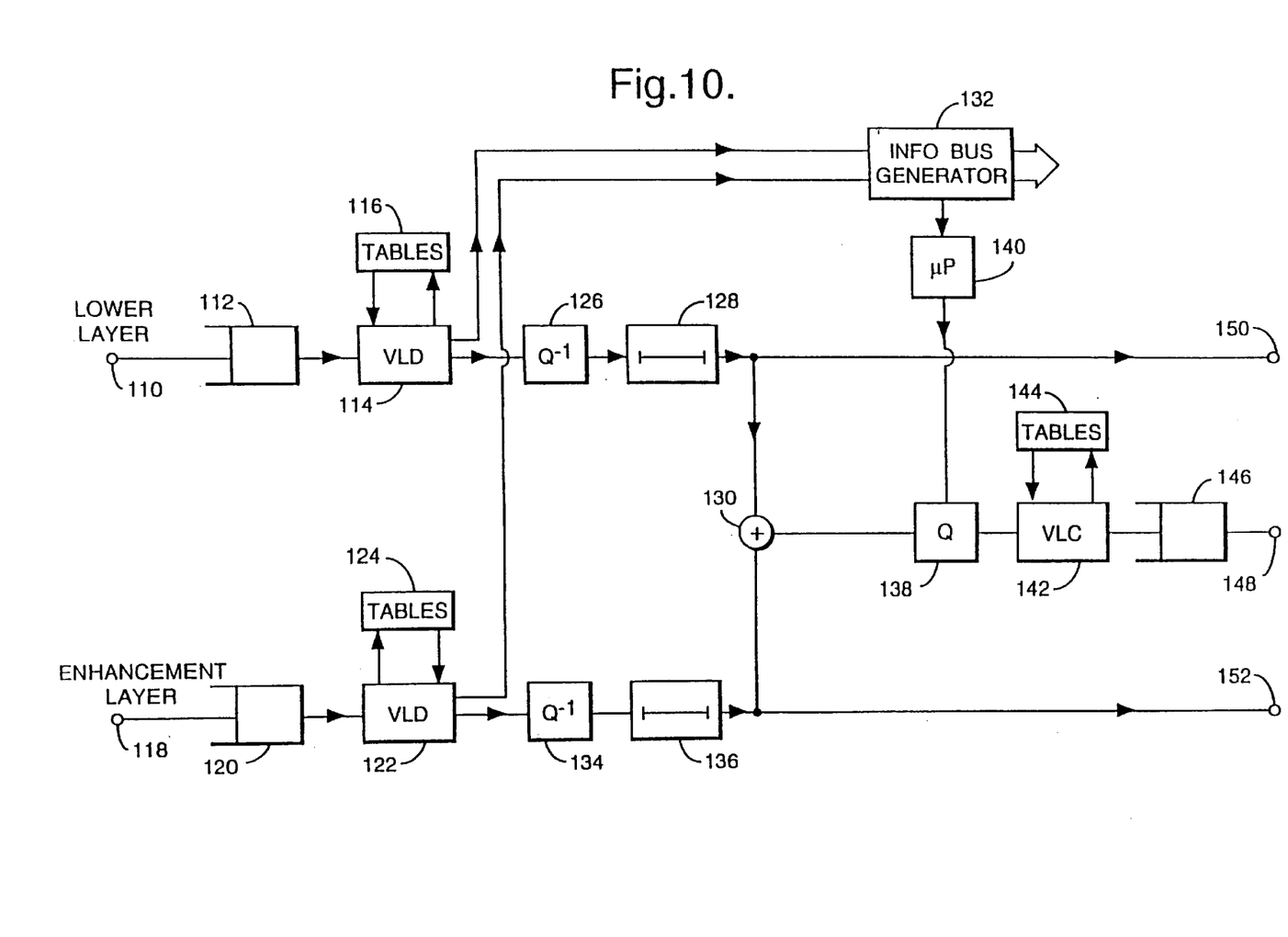
FIG. 10 is a block diagram of an SNR layer combiner according to the invention.

During the decoding process, information concerning the efficiency and other aspects of the decoding procedure is fed to an information bus generator 132.

Output from the lower layer VLD 114 passes, through an inverse quantisation unit 126 and a delay 128, to an adder 130 which similarly receives, through inverse quantisation unit 134 and a delay 136, the output from the enhancement layer VLD 122. It will be understood that the function of adder 130 is to recreate the original unquantised coefficient stream. This is then quantised afresh in quantisation unit 138 under the control of a microprocessor 140 which receives information from the information bus generator 132. The output from the quantisation unit 138 is recoded in a VLC 142 using look up table 144, with the output passing through output buffer 146 to a Main Profile output terminal 148. The microprocessor 140 seeks to control the re-quantisation procedure so that the output buffer 146 neither overflows nor underflows.

The circuit can also make available, on respective terminals 150 and 152, the coefficient level lower and enhancement levels for inverse DCT and pixel regeneration, if required.

It will be understood that the applications of bit rate conversion and recombining SNR streams in MPEG-2 have been described merely as examples of this aspect of the present invention. Alternative examples of synchronising, re-multiplexing, and the extraction of coding information have already been mentioned. Still further examples will occur to the skilled man.

What is claimed is:

1. A signal transmission chain comprising at least one video compression coder adapted to receive a digital video signal and to generate therefrom a compressed or partially compressed coded signal utilising motion compensation based on macroblocks of a picture, and at least one compression decoder adapted to receive a compressed or partially compressed coded signal and to generate therefrom a decoded or partially decoded signal, characterised in that an information bus extends from a decoder or to a coder in the chain, the information bus including a picture rate timing and a macroblock rate timing and carrying both picture rate and macroblock rate information relating to a coding operation for use in a later signal process.

2. A signal transmission chain according to claim 1, wherein the information bus extends from a decoder to a later coder in the chain.

3. A signal transmission chain according to claim 2, wherein the information bus carries information relating to a decoding process in said decoder for use in an encoding process in said coder.

4. A signal transmission chain according to claim 1 wherein the information bus carries motion vector information together with at least one piece of information selected from the group consisting of macroblock scan mode; error concealment flag; causes for concealment; numbers of bits used per block; and candidate motion vectors.

5. A signal transmission chain according to claim 1 wherein the information bus carries motion vector information together with at least one piece of information selected from the group consisting of motion vector source; cut detection; numbers of I, P and B frames remaining in GOP; film phase (or 3:2 pulldown) detection; field or frame like index; pan vector identification; and letterbox detection.

6. A signal transmission chain according to claim 1, wherein the picture rate information carried by the information bus comprises coding type and quantiser matrix information.

7. A signal transmission chain according to claim 6, wherein the picture rate information carried by the information bus further comprises time reference and display offsets information.

8. A signal transmission chain according to claim 6, wherein the picture rate information further includes at least one piece of information selected from the group consisting of motion vector source; cut detection; numbers of I, P and B frames remaining in GOP; film phase (or 3:2 pulldown) detection; field or frame like index; pan vector identification; and letterbox detection.

9. A signal transmission chain according to claim 1, wherein the macroblock rate information carried by the information bus comprises macroblock type, and motion vector information.

10. A signal transmission chain according to claim 9, wherein the macroblock rate information carried by the information bus further comprises motion type and motion vector type information.

11. A signal transmission chain according to claim 9, wherein the macroblock rate information carried by the information bus further includes at least one piece of information selected from the group consisting of macroblock scan mode; error concealment flag; causes for concealment; numbers of bits used per block; and candidate motion vectors.

12. A signal transmission chain comprising at least one video compression coder adapted to receive a digital video signal and to generate therefrom a compressed or partially compressed coded signal utilising motion compensation based on macroblocks of a picture, and at least one compression decoder adapted to receive a compressed or partially compressed coded signal and to generate therefrom a decoded or partially decoded signal, characterised in that an information bus extends from a decoder or to a coder in the chain, the information bus including a picture rate timing and a macroblock rate timing and carrying both picture rate and macroblock rate information relating to a coding operation for use in a later signal process, the picture rate information comprising coding type and quantiser matrix information and the macroblock rate information comprising macroblock type and motion vector information.

* * * * *